United States Patent
Thompson et al.

(10) Patent No.: US 8,091,860 B2
(45) Date of Patent: Jan. 10, 2012

(54) VALVE WITH SENSOR

(75) Inventors: David Matthew Thompson, West Midlands (GB); Mark Jason Michael Densley, Littleton, CO (US); Christopher Simon Patient, West Midlands (GB)

(73) Assignee: Norgren Inc., Littleton, CO (US)

( * ) Notice: Subject to any disclaimer, the term of this patent is extended or adjusted under 35 U.S.C. 154(b) by 830 days.

(21) Appl. No.: 12/093,761

(22) PCT Filed: Nov. 22, 2005

(86) PCT No.: PCT/US2005/043310
§ 371 (c)(1),
(2), (4) Date: May 15, 2008

(87) PCT Pub. No.: WO2007/061424
PCT Pub. Date: May 31, 2007

(65) Prior Publication Data
US 2008/0264498 A1    Oct. 30, 2008

(51) Int. Cl.
*F16K 31/02* (2006.01)
(52) U.S. Cl. ............... 251/129.04; 251/129.01; 137/554
(58) Field of Classification Search ............ 251/129.01, 251/129.04; 137/553, 554
See application file for complete search history.

(56) References Cited

U.S. PATENT DOCUMENTS

| | | |
|---|---|---|
| 4,523,286 A | 6/1985 | Koga |
| 4,632,358 A * | 12/1986 | Orth et al. ............. 251/117 |
| 5,197,328 A | 3/1993 | Fitzgerald |
| 5,331,152 A | 7/1994 | Fenton |
| 5,433,245 A | 7/1995 | Prather |
| 6,005,308 A * | 12/1999 | Bryde et al. ............. 307/157 |
| 6,896,407 B2 * | 5/2005 | Nomiyama et al. ......... 374/142 |

FOREIGN PATENT DOCUMENTS

| | | |
|---|---|---|
| EP | 0287299 A2 | 10/1988 |
| EP | 0844425 A | 5/1998 |
| EP | 1069319 A | 1/2001 |
| GB | 2062124 A | 5/1981 |
| WO | WO-96/35066 A | 11/1996 |

* cited by examiner

*Primary Examiner* — John Fristoe, Jr.
(74) *Attorney, Agent, or Firm* — The Ollila Law Group LLC

(57) ABSTRACT

A valve is provided according to one embodiment of the invention. The valve comprises a piston (104), a housing (106) surrounding the piston (104), an inlet (108) capable of allowing fluid into the valve, an exhaust (110) capable of allowing fluid out of the valve, a light source (112) capable of emitting light directed at the piston (104), and a light sensor (114) capable of measuring an intensity of the light received from the light source (112), said intensity varying based on the position of the piston (104) within the housing (106). A piston assembly is also provided according to an embodiment of the invention, in which a light source 608 and a light sensor 610 may be used to determine the position of the piston. A system is provided for obtaining and analyzing operational status information is provided according to an embodiment of the invention. An action may be automatically taken depending on the analyzed operational status. A method is provided for automatically performing a diagnostic operation on a valve. A safety protocol may be executed based on the outcome of the diagnostic operation.

13 Claims, 6 Drawing Sheets

VALVE WITH SENSOR

This application is a National Stage of International Application No. PCT/US2005/043310, filed Nov. 22, 2005, the disclosure of which is hereby incorporated herein by reference.

BACKGROUND OF THE INVENTION

A valve is a mechanical device by which the flow of fluid may be started, stopped, or regulated by a movable part that opens or obstructs passage. A valve may be controlled manually, pneumatically, hydraulically, mechanically, electrically, or using a combination thereof. A valve may be used for a variety of purposes, including flow control, pressure control, and directional control.

Up until now, operators of systems having one or more valves had to infer or estimate valve movement by measuring the electrical current in one or more solenoid coils associated with each valve. However, measuring the current in this way does not provide any direct data on whether the valve has actually moved. Likewise, it is impossible to tell from the current in a solenoid coil whether any fluid is actually in the valve.

SUMMARY OF THE INVENTION

A valve is provided according to one embodiment of the invention. The valve comprises a piston, a housing surrounding the piston, an inlet capable of allowing fluid into the valve, an exhaust capable of allowing fluid out of the valve, a light source capable of emitting light directed at the piston, and a light sensor capable of measuring an intensity of the light received from the light source, said intensity varying based on the position of the piston within the housing.

A system for obtaining and analyzing operational status information is provided according to an embodiment of the invention. A sensor module measures operational status information relating to a valve. A valve control module controls the valve. A processor module analyzes the operational status information. Finally, an input/output module displays operational status information and allows user control of the processor module.

A method is provided for automatically performing a diagnostic operation on a valve. First, the valve is actuated. Next, operational status information relating to the valve is received. Finally, it is determined whether the valve is operating within acceptable parameters.

A piston assembly is provided according to another embodiment of the invention. The piston assembly comprises a piston, a housing surrounding the piston, a passage capable of allowing fluid in and out of the housing, a light source capable of emitting light directed at the piston, and a light sensor capable of measuring an intensity of the light received from the light source, said intensity varying based on the position of the piston within the housing.

ASPECTS OF THE INVENTION

In one embodiment of the valve, the light sensor outputs a voltage corresponding to a digital bit value.

In another embodiment of the valve, the light sensor outputs a voltage corresponding to an analog value.

In yet another embodiment of the valve, the light received by light sensor from the light source travels directly from the light source to the light sensor.

In yet another embodiment of the valve, the light received by light sensor from the light source travels indirectly, via reflection, from the light source to the light sensor.

In yet another embodiment of the valve, the light source may emit light of a plurality of intensities.

In yet another embodiment of the valve, a high light intensity may be used to verify that the light source and the light sensor are operational.

In yet another embodiment of the valve, the light sensor is substantially adjacent to the light source within the housing.

In yet another embodiment of the valve, the light sensor is substantially opposite from the light source within the housing.

In yet another embodiment of the valve, the piston is comprised of a spool.

In yet another embodiment of the valve, the piston is comprised of a poppet.

In one embodiment of the system, the processor module is capable of initiating one or more actions based on the operational status information, said one or more actions selected from the group consisting of reverting to a safe valve state, shutting down the valve, temporarily suspending operation of the valve, increasing the electrical current to the valve, decreasing the electrical current to the valve, rerouting fluid to one or more other valves, activating an alarm, displaying a warning message, displaying an error message, sending operational status data to one or more other nodes over an industrial network, sending a warning message to one or more other nodes over an industrial network, sending an error message to one or more other nodes over an industrial network, and logging an incident in memory.

In another embodiment of the system, the sensor module comprises one or more light sources in a valve housing, and one or more light sensors in a valve housing.

In yet another embodiment of the system, the sensor module comprises one or more pressure sensors in a valve inlet.

In yet another embodiment, the one or more pressure sensors are used to track a valve supply pressure in relation to a minimum pressure threshold.

In yet another embodiment, the one or more pressure sensors are used to track a valve supply pressure in relation to a maximum pressure threshold.

In yet another embodiment of the system, the one or more pressure sensors are used to detect a soft start.

In yet another embodiment of the system, the sensor module comprises one or more temperature sensors in a valve inlet.

In yet another embodiment of the system, the processor module tracks usage data for the valve.

In yet another embodiment of the system, the processor module uses the usage data to predict the remaining life of the valve.

In yet another embodiment of the system, the processor module tracks cycle time for the valve.

In yet another embodiment of the system, the processor module uses the cycle time to track deterioration of the valve.

In one embodiment of the method, a safety protocol is executed.

In another embodiment of the method, the safety protocol is comprised of one or more actions, said one or more actions selected from the group consisting of reverting to a safe valve state, shutting down the valve, temporarily suspending operation of the valve, increasing the electrical current to the valve, decreasing the electrical current to the valve, rerouting fluid to one or more other valves, activating an alarm, displaying a warning message, displaying an error message, sending operational status data to one or more other nodes over an industrial network, sending a warning message to one or more other nodes over an industrial network, sending an error message to one or more other nodes over an industrial network, and logging an incident in memory.

In one embodiment of the piston assembly, the light received by light sensor from the light source travels directly from the light source to the light sensor.

In another embodiment of the piston assembly, the light received by light sensor from the light source travels indirectly, via reflection, from the light source to the light sensor.

DESCRIPTION OF THE DRAWINGS

It should be understood that the drawings are not necessarily to scale.

DETAILED DESCRIPTION OF THE INVENTION

Figure 1:
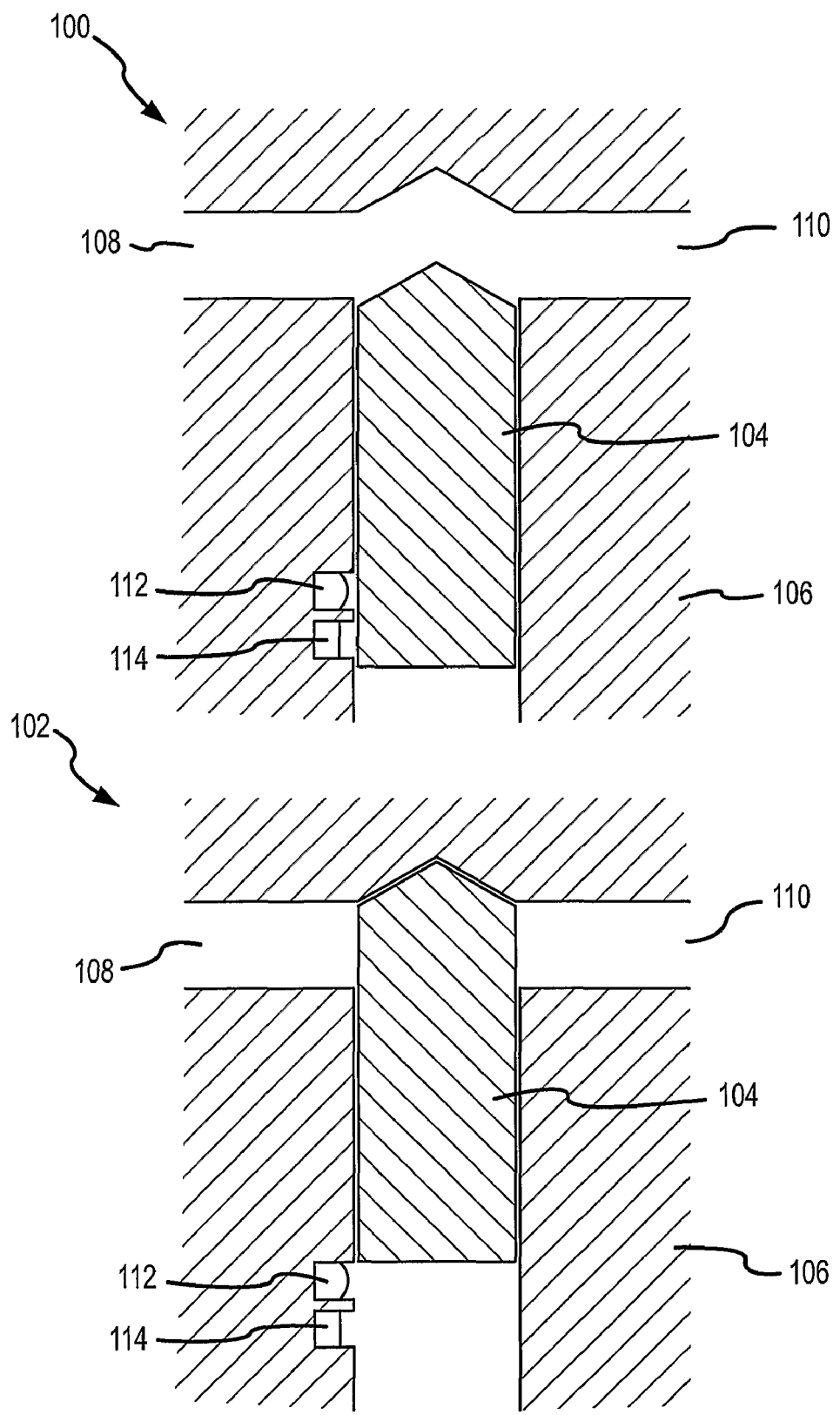
FIG. 1 illustrates a valve according to an embodiment of the claimed invention.

By placing a light source and a light sensor in the housing of a valve or piston bore, operational status information can be measured directly. FIG. 1 illustrates an exemplary instantiation of a valve in both an open position 100 and a closed position 102. Piston 104 may move up and down within housing 106 to control flow of a fluid (not pictured). When the valve is in open position 100, fluid is allowed to flow between inlet 108 and exhaust 110. Conversely, when the valve is in closed position 102, fluid is blocked from entering the housing through inlet 108.

Light source 112 may be a light emitting diode (LED), light bulb, or other light emitting component. Light source 112 emits light into housing 106. Light sensor 114 is an electronic component responsive to optical input. Light sensor 114 may be a photodiode, a cadmium sulfide cell, a silicon phototransistor, or other light sensing circuit element. The electrical current through light sensor 114 changes depending on the amount of light shining on the light-sensitive surface of light sensor 114. Light sensor 114 is located substantially adjacent to light source 112 in housing 106. Light sensor 114 is thus capable of detecting the light from light source 112, and light sensor 114 can therefore be used in conjunction with light source 112 to allow detection of the position of piston 104. When the valve is in open position 100, the light from light source 112 travels indirectly, via reflection off of piston 104, to light sensor 114. In contrast, when the valve is in closed position 102, little or no light from light source 112 is reflected by piston 104. Consequently, light sensor 114 receives very little direct or reflected light when the valve is in closed position 102. By measuring the current at light sensor 114, the amount of reflected light, and thus, the position of piston 104 may be determined. Piston position data can be useful for examining the operational status of a valve. In addition to verifying basic functioning of the valve, more advanced diagnostic information can be obtained as discussed below, in conjunction with FIG. 2.

Light source 112 may be capable of a plurality of emitted light intensities. More specifically, a high intensity setting may be used to test the functioning of the sensor itself without disassembling the valve or any of the valve components. The intense emitted light will be reflected throughout the valve and picked up by light sensor 114 even when the valve is closed. If the expected current change is observed at light sensor 114, then both light source 112 and light sensor 114 can be verified as working.

In an embodiment, when the valve is in open position 100, light from light source 112 that is received by light sensor 114 may be brighter than usual when no fluid is present in the valve. Light source 112 and light sensor 114 may therefore be used to detect problems with the fluid supply.

In an embodiment, light sensor 114 has a digital output of "1" (open) when a specific light threshold is reached, and a digital output of "0" (closed) otherwise. In a further embodiment, the light threshold of light sensor 114 may be manually set or programmed. In an alternate embodiment, light sensor 114 outputs an analog approximation of a the light level on a linear or non-linear scale, and said analog approximation is decoded into an "open" or "closed" value by a controller or microprocessor. The output of light sensor 114 may be inverted, and/or logically combined with the output of other light sensors (not pictured) relating to the same piston, or another piston, prior to being measured without departing from the scope of the claimed invention. In an embodiment, a plurality of light sensors may exist in a housing 106 at different positions to provide positional data with greater spatial resolution.

Figure 2:
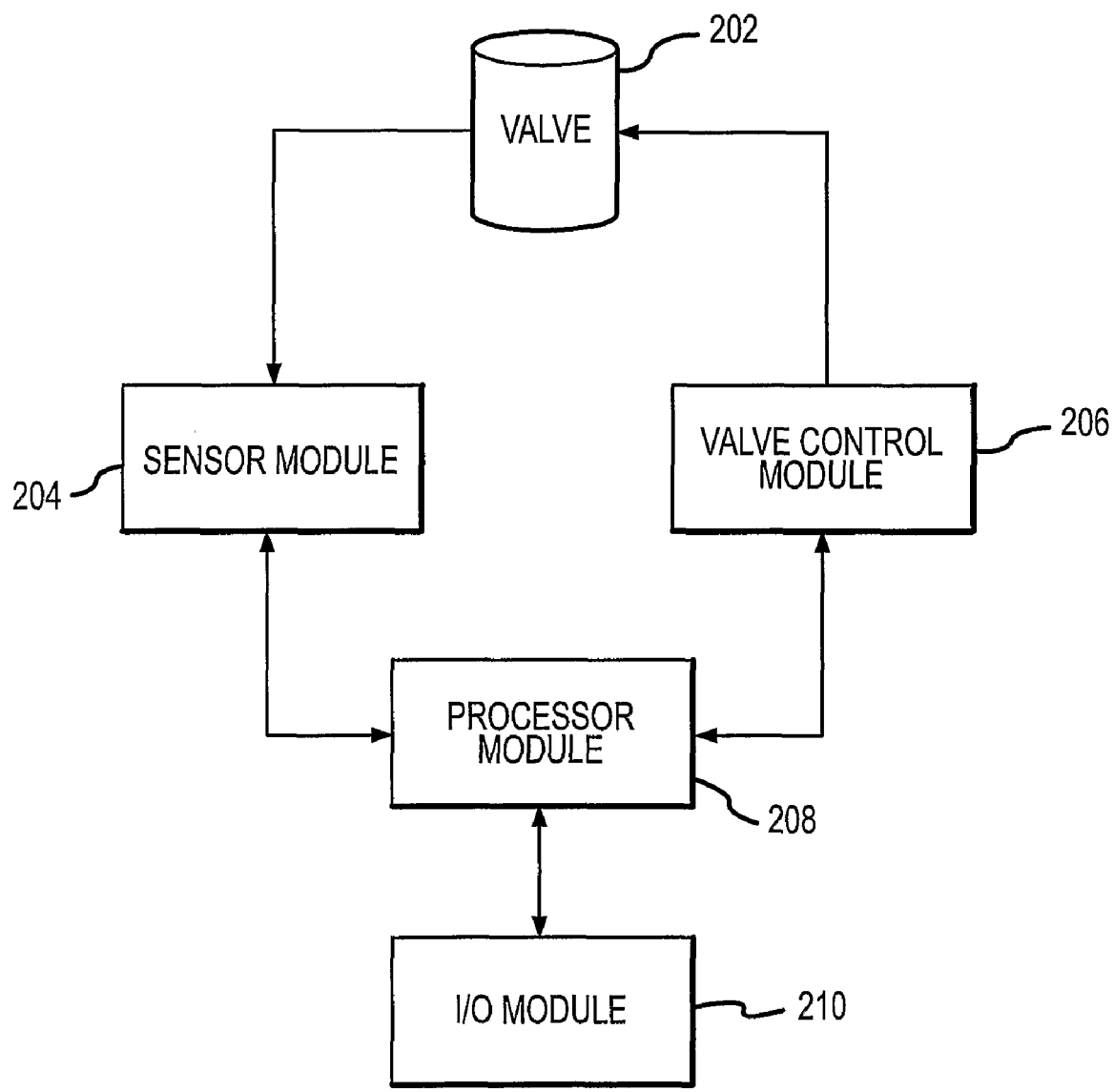
FIG. 2 is a block diagram illustrating the modules that comprise one embodiment of the present invention.

FIG. 2 illustrates the modules comprising one embodiment of the claimed invention, in which operational status information may be automatically observed and acted upon by a processor module 208. A valve 202 is capable of opening and closing one or more passages through a valve housing. A sensor module 204 is connected to the valve, and measures aspects of the operational state of the valve 202 such as valve position, static valve pressure, dynamic valve pressure, pressure fluctuations with time, valve temperature, etc. In an embodiment, sensor module 204 comprises an optical sensor for determining valve position as discussed above in conjunction with FIG. 1. In another embodiment, sensor module 204 comprises one or more temperature sensors and/or one or more pressure sensors. In an alternate embodiment, sensor module 204 comprises one or more other types of sensors known in the art.

A valve control module 206 controls the valve 202, and more specifically is capable of controlling one or more moving parts within the valve 202 such as spools, pistons, poppets, balls, discs, gates, needles, or other mechanisms. In an embodiment, valve control module 206 controls how much electrical current travels through a coil associated with valve 202. A given sensor module 204 may be used to monitor a plurality of sensors of similar, or different, types. Similarly, a given valve control module 206 may control a plurality of valves of similar, or different, types.

A processor module 208 contains a microprocessor or microcontroller capable of executing user commands and running diagnostic programs, and contains memory for storing data and/or diagnostic programs. In an embodiment, processor module 208 is a personal computer (PC). Memory may be comprised of SRAM (Static Random Access Memory), DRAM (Dynamic Random Access Memory), ROM (Read Only Memory), flash memory, a hard drive, or other type of memory, or a combination thereof. A diagnostic program may be comprised of software suitable for execution by processor module 208, firmware suitable for execution by processor module 208, or a combination thereof. Processor module 208 sends control commands to valve control module 206, and receives operational status information from sensor module 204. An input/output (I/O) module 210 displays output from processor module 208, and allows users to interact with processor module 208. Users can execute diagnostic programs, control valves, and check the operational status of a valve using I/O module 210. In an embodiment, I/O module 210 allows users to write diagnostic programs. In another embodiment, users can access historical data relating to past diagnostic measurements for a given valve.

Processor module 208 allows for advanced valve diagnostic tests. For example, processor module 208 may issue a command to valve control module 206 to change the position of valve 202, then monitor input from sensor module 204 to determine the valve stroke time (the length of time between the valve control module 206 beginning the control operation, and the time when the valve 202 completes its positional change according to sensor module 204). Since a valve may speed up or slow down as it wears, overall valve wear can be computed and tracked using processor module 208. In an embodiment, historical data relating to a valve 202's stroke time is tracked so that wear on the valve 202 can be estimated. When a valve 202 begins to wear out, a warning message can be displayed to the user via I/O module 210. Alternatively, when a valve 202 wears out or begins to wear out, fluid flow can be rerouted to other, less worn valves (not pictured) until valve 202 can be serviced or replaced. In another embodiment, wear data is tracked across multiple valves in a system to identify the weak links in that system for replacement, or as a starting point for troubleshooting should the system fail.

In an embodiment, processor module 208, in conjunction with I/O module 210, warns users of imminent failures. In a further embodiment, processor module 208, in conjunction with I/O module 210, indicates what corrective action is required to remedy the failure. Processor module 208 may also provide the user with one or more reasons for the failure, or one or more likely reasons for the failure, with the help of I/O module 210.

In another embodiment, processor module 208 in conjunction with sensor module 204 track supply pressure at the inlet of valve 202. Processor module 208 compares the supply pressure with a minimum threshold, and signals a problem and/or takes corrective action if the supply pressure is below the minimum threshold. In another embodiment, processor module 208 compares the supply pressure with a maximum threshold, and signals a problem and/or takes corrective action if the supply pressure is above the maximum threshold.

In still another embodiment, valve supply pressure is used to detect soft starts. The cycle in a soft start valve begins slowly so as not to send a shockwave through the fluid in a system. Conversely, the presence of a soft start in a non-soft-start valve can indicate a fluid leak or other problem. Processor module 208 compares an observed supply pressure progression to an expected pressure progression in a soft start system, and signals a problem and/or takes corrective action if the observed pressure exceeds the expected pressure at any point. Conversely, if processor module 208 detects an observed pressure that is lower than an expected pressure in a non-soft-start system, processor module 208 may signal a problem and/or take corrective action.

Valve stroke time may also be tracked across several valves by processor module 208. Using this information, sequential valves (valves that operate in sequence to accomplish a multistage operation) can be tuned in relation to one another. In an embodiment, processor unit 208 can use timing data to automatically tune sequential valves in relation to one another.

Valve stroke times may be tracked over time, and gradual changes in stroke time used to extrapolate valve deterioration and predict eventual valve failure.

The number of times a valve cycles over a unit of time may also be tracked so that the usage rates of the valve may be tracked. In an embodiment, this valve usage data may be used to predict the remaining life of the valve based on how many total cycles the valve is rated for, and/or based on the estimated time until failure of the valve.

Figure 3:
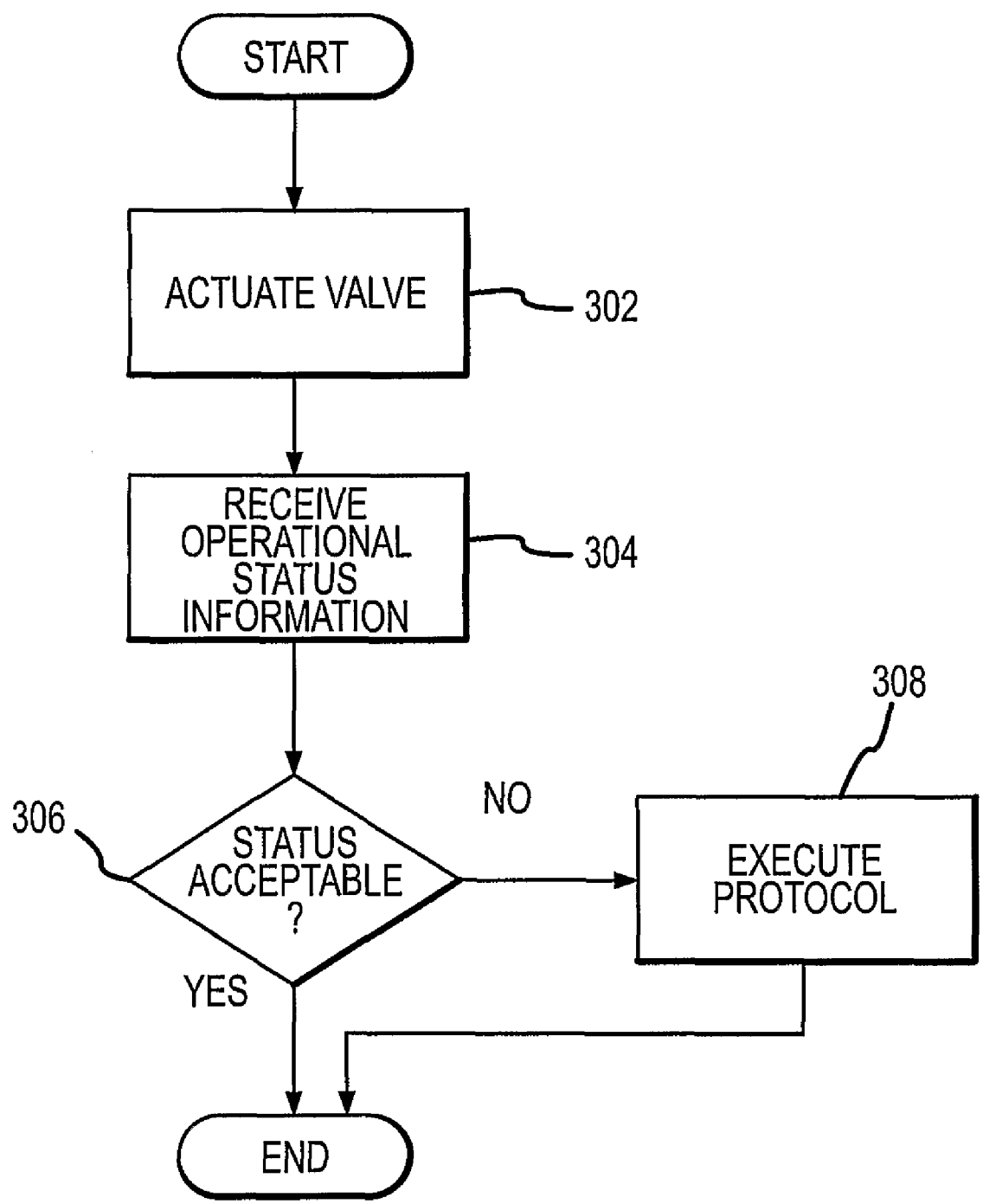
FIG. 3 illustrates the operational flow of the operations performed in accordance with one embodiment of the present invention.

FIG. 3 illustrates the operations performed in one embodiment of the claimed invention, in which operational status data is elicited and stored, and the acceptability of the operational status data is determined. Actuate operation 302 actuates an element within a valve. The element may be a piston, spool, ball, disc, gate, needle, or other device.

During actuation, receive operation 304 receives operational status information relating to the piston. The operational status information may be comprised of the position of an element within the valve as determined using a light source and light sensor, the presence of overpressure or underpressure in the valve as determined by a pressure sensor in a valve inlet, the temperature in the valve as determined by a temperature sensor in a valve inlet or a valve exhaust, the presence of vacuum in the valve as determined by a pressure sensor in a valve inlet, the detection of a soft start, the usage rate of the valve (including whether the valve is being used at a rate beyond the specification of the valve), whether the valve is nearing the end of its life, or other information.

Determine operation 306 evaluates some or all of the operational status information received by receive operation 304, and determines whether the operational status information status is within acceptable parameters. Said acceptable parameters may be defined by a user, supplied by a valve manufacturer, automatically calculated by a computer based on past operational status data for the valve, or based on operational status data for one or more different valves.

If the operational status of the valve is acceptable, flow branches YES to the end of the operational flow. However, if the operational status of the valve is not acceptable, flow branches NO to execute operation 308.

Execute operation 308 executes a safety protocol in response to the unacceptable operational status of the valve. The safety protocol may warn users of an imminent failure, or of the detection of an actual failure, and indicate what corrective action is required. The safety protocol may also provide the user with one or more reasons for the failure, and/or one or more likely reasons for the failure. The safety protocol may include reverting to a safe valve state, shutting down the valve, temporarily suspending operation of the valve, increasing or decreasing the current to the valve to compensate for wear, rerouting fluid to one or more other valves, activating an alarm, displaying a warning message or error message to a user via an I/O interface, logging the incident in memory, or any combination thereof.

In an embodiment, the safety protocol includes sending operational status information, or a warning or error message, over an industrial network (such as a fieldbus network) to a second node. The program or protocol at the second node then determines the appropriate response to the condition. In an embodiment, the program or protocol at the second node also executes the response. In an alternate embodiment, the program or protocol at the second note sends the response to another node for execution. The second node may also log the occurrence.

In this way, problems with valves can be automatically resolved or worked around without requiring input from a user. Further, a problem with a system of valves may be identified much more quickly than would otherwise be possible.

Figure 4:
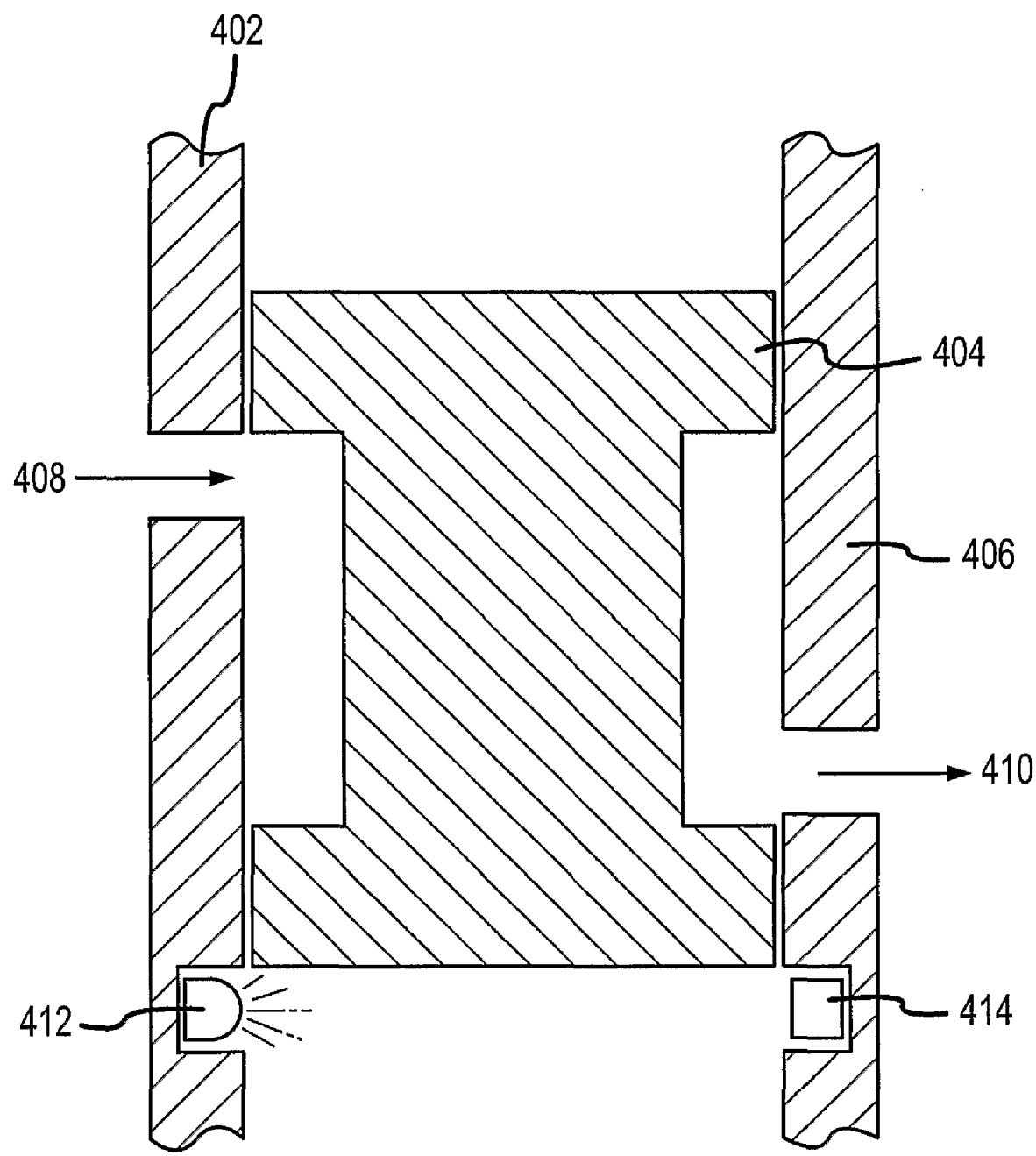
FIG. 4 illustrates a spool valve according to an embodiment of the claimed invention.

FIG. 4 illustrates a light source 412 and a light sensor 414 in the housing 406 of a spool valve 402. Spool 404 may move up and down within housing 406 to control flow of a fluid (not pictured). When the valve is in an open position as pictured, fluid is allowed to flow between inlet 408 and exhaust 410, around the center of spool 404. Conversely, when the valve is in a closed position (not pictured), fluid is blocked from entering the housing through inlet 408.

Light source 412 emits light into housing 406. The current through light sensor 414 changes depending on the amount of light shining on the light-sensitive surface of light sensor 414. Light sensor 414 is thus capable of detecting the light from light source 412, and light sensor 414 can therefore be used in conjunction with light source 412 to allow detection of the position of spool 404. Light source 412 is substantially directly opposite from light sensor 414 in housing 406. Consequently, when the valve is in an open position, the light from light source 412 travels directly to light sensor 414. In contrast, when the valve is in a closed position, the light from light source 412 is substantially blocked by spool 404. Consequently, light sensor 414 receives very little light. By measuring the current at light sensor 414, the position of spool 404 may be determined. As discussed previously, light source 412 may be capable of a plurality of emitted light intensities. A high intensity setting may be used to test the functioning of the sensor itself without disassembling the valve or any of the valve components. The intense emitted light will be reflected throughout the valve, and picked up by light sensor 414 even if the valve is closed. If the expected current change is observed at light sensor 414, then both light source 412 and light sensor 414 can be verified as working.

In an embodiment, when the valve is in an open position, light from light source 412 that is received by light sensor 414 may be brighter when no fluid is present in the valve. Light source 412 and light sensor 414 may therefore be used to detect problems with the fluid supply.

Light sensor 414 may have a digital or analog output. In an embodiment, light sensor 414 has digital output, and a programmable or otherwise adjustable light threshold. The output of light sensor 414 may be inverted, and/or logically combined with the output of other light sensors (not pictured) prior to being measured without departing from the scope of the claimed invention.

Figure 5:
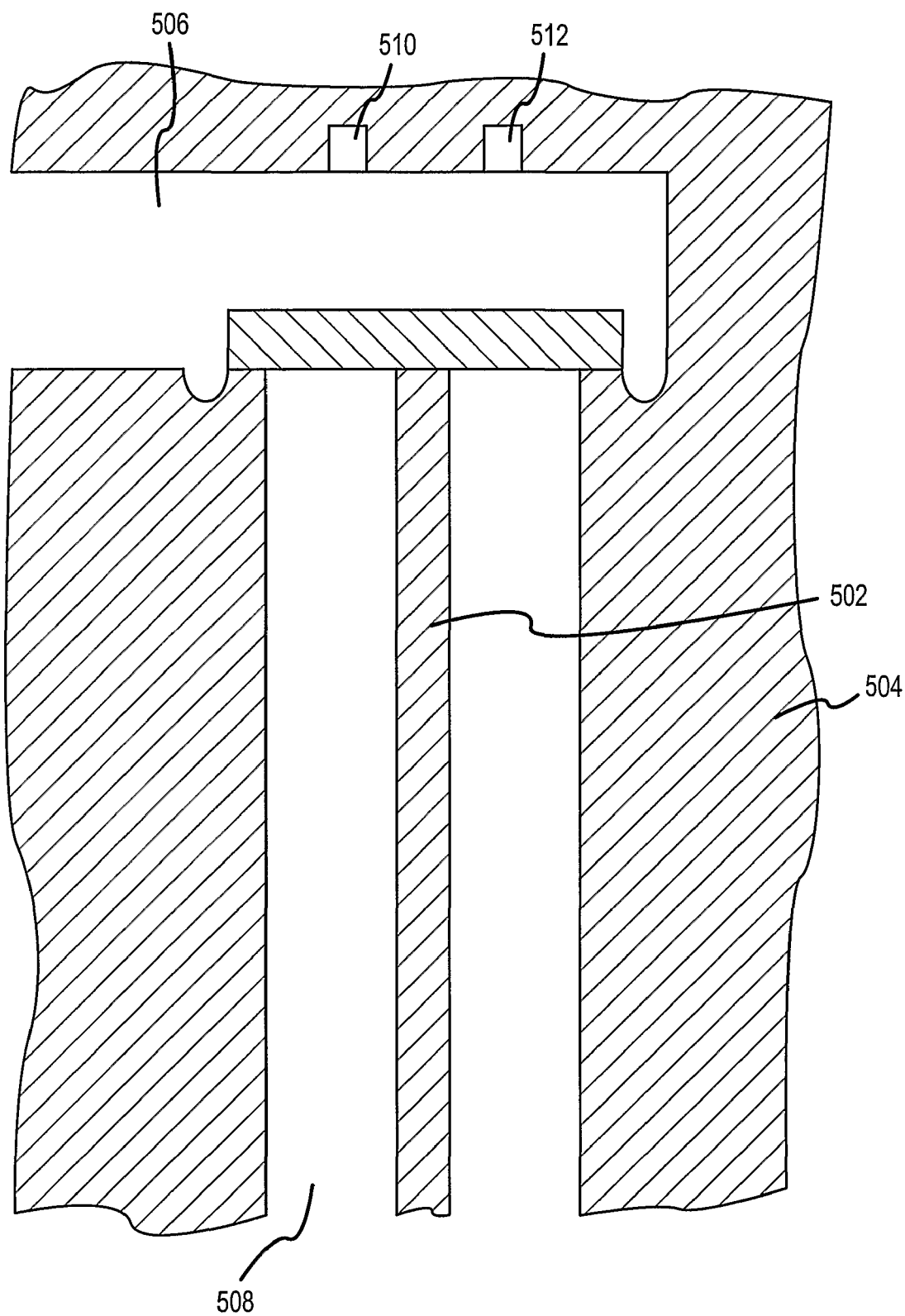
FIG. 5 illustrates a poppet valve according to an embodiment of the claimed invention.

FIG. 5 illustrates a light source 510 and a light sensor 512 in the housing 504 of a poppet valve in a closed position. Poppet 502 is capable of moving upwards through a bore in housing 504, thus breaking the seal formed between poppet 502 and housing 504 and allowing fluid to pass from inlet 506 to exhaust 508. Light source 510 emits light which reflects off of poppet 502. The reflected light is measured at light sensor 512, light sensor 512 being substantially adjacent to light source 510 in housing 504. Based on the amount of measured reflected light, the proximity of poppet 502 to light sensor 512 can be determined.

Figure 6:
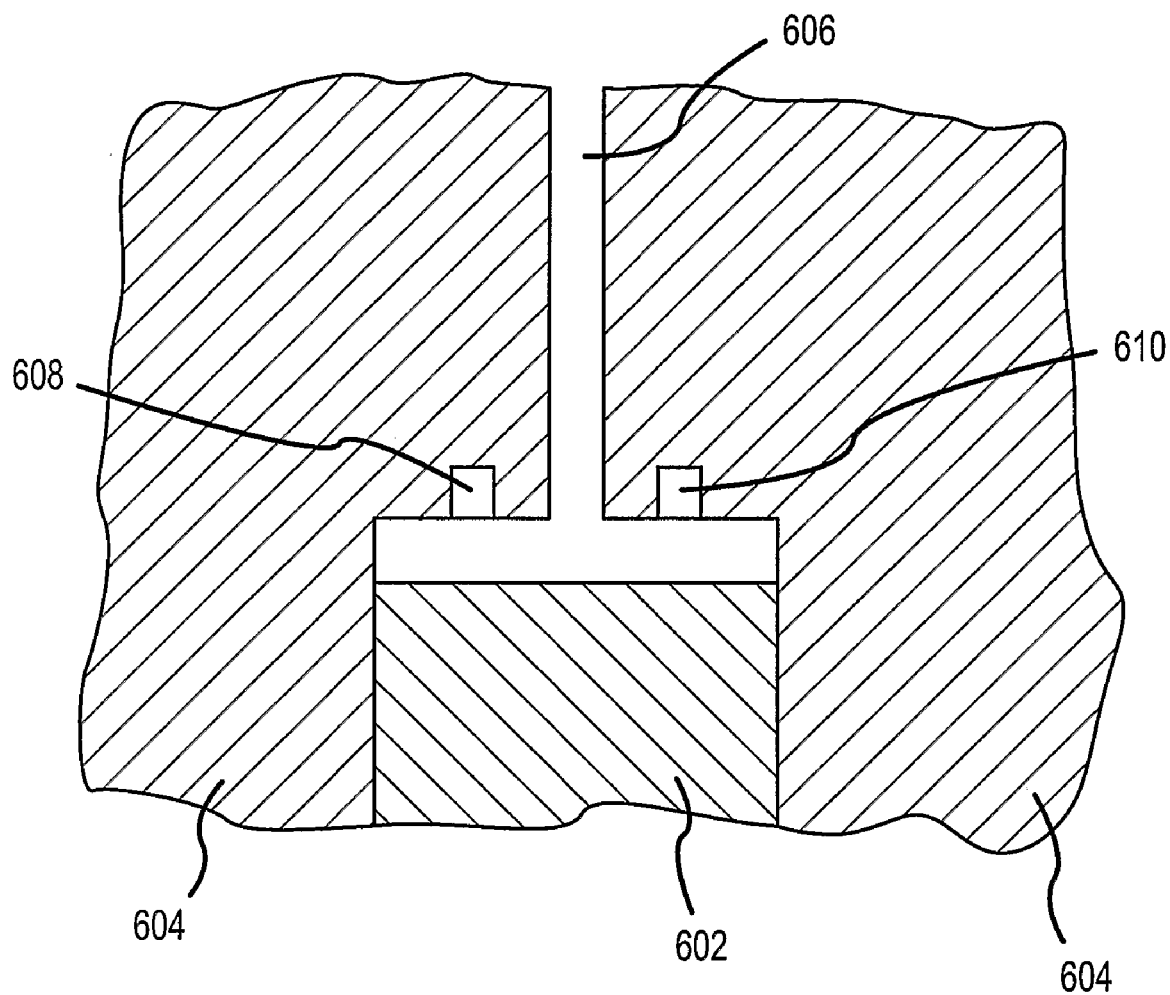
FIG. 6 illustrates a piston assembly according to an embodiment of the claimed invention.

FIG. 6 illustrates a light source 608 and a light sensor 610 in the housing 604 of a piston bore. Fluid enters and exits the piston bore through passage 606. Light source 608 emits light which reflects off of piston 602. The reflected light is measured at light sensor 610, light sensor 610 being substantially adjacent to light source 608 in housing 604. Based on the amount of measured reflected light, the proximity of piston 602 to light sensor 610 can be determined.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

What is claimed is:

1. A valve, comprising:
a piston;
a housing surrounding the piston;
an inlet capable of allowing fluid into the valve;
an exhaust capable of allowing fluid out of the valve;
a light source capable of emitting light at a plurality of emitted light intensities directed at the piston; and
a light sensor capable of measuring an intensity of the light received from the light source, said intensity varying based on the position of the piston within the housing.

2. The valve according to claim 1, wherein the light sensor outputs a voltage corresponding to a digital bit value.

3. The valve according to claim 1, wherein the light sensor outputs a voltage corresponding to an analog value.

4. The valve according to claim 1, wherein the light received by light sensor from the light source travels directly from the light source to the light sensor.

5. The valve according to claim 1, wherein the light received by light sensor from the light source travels indirectly, via reflection, from the light source to the light sensor.

6. The valve according to claim 1, wherein the light source and the light sensor is positioned within a fluid flow path.

7. The valve according to claim 1, wherein a high light intensity is used to verify that the light source and the light sensor are operational.

8. The valve according to claim 1, wherein the light sensor is substantially adjacent to the light source within the housing.

9. The valve according to claim 1, wherein the light sensor is substantially opposite from the light source within the housing.

10. The valve according to claim 1, wherein said piston is a cylinder with a tapered end.

11. The valve according to claim 1, wherein said piston is a spool.

12. The valve according to claim 1, wherein said piston is a poppet.

13. A piston assembly, comprising:
a piston;
a housing surrounding the piston;
a passage capable of allowing fluid in and out of the housing;
a light source capable of emitting light directed at the piston; and
a light sensor capable of measuring an intensity of the light received from the light source, said intensity varying based on the position of the piston within the housing;
wherein the light received by the light sensor from the light source travels directly from the light source to the light sensor.

* * * * *